US006547093B1

(12) United States Patent
Messer et al.

(10) Patent No.: US 6,547,093 B1
(45) Date of Patent: Apr. 15, 2003

(54) PLASTIC CONTAINER FOR FOOD PRODUCTS

(75) Inventors: Donald P. Messer, Eden Prairie, MN (US); William E. Archibald, Maple Grove, MN (US); Samir Asmail Naghaway, Cypress, CA (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 09/514,691

(22) Filed: Feb. 28, 2000

(51) Int. Cl.[7] ................................................. B65D 1/42
(52) U.S. Cl. ........................ 220/659; 220/359.1; 215/45
(58) Field of Search ........................... 220/359.1, 359.4, 220/359.2, 359.3, 640, 641, 276, 656, 659, 657, 658; 229/400–405; 215/44, 45, 43, 232, 324; D7/602; D9/516, 518, 529

(56) References Cited

U.S. PATENT DOCUMENTS

| | | | |
|---|---|---|---|
| 3,039,646 A | 6/1962 | Merz | |
| 3,204,799 A | 9/1965 | Hunter et al. | |
| 3,273,746 A | 9/1966 | Andrews, Jr. | |
| 3,403,804 A | 10/1968 | Columbo | |
| 3,441,173 A | 4/1969 | Edwards | |
| 3,478,913 A | 11/1969 | Kemp | |
| 3,499,567 A | 3/1970 | Spotts | |
| 3,666,088 A | 5/1972 | Wingardh | |
| 3,739,939 A | 6/1973 | Koenig | |
| 3,788,509 A | 1/1974 | Keeler | |
| 4,049,122 A | 9/1977 | Maxwell | |
| 4,096,947 A | 6/1978 | Morse | |
| 4,157,147 A | * 6/1979 | DeForest et al. | ............ 229/4.5 |
| D252,796 S | 9/1979 | Fortuna et al. | |
| D254,293 S | 2/1980 | Fortuna et al. | |
| 4,193,494 A | 3/1980 | Green | |
| 4,326,567 A | 4/1982 | Mistarz | |

(List continued on next page.)

FOREIGN PATENT DOCUMENTS

| | | | |
|---|---|---|---|
| DE | 2640479 | * | 3/1977 |
| EP | 0159051 | | 10/1985 |
| FR | 2082062 | * | 12/1971 |
| GB | 1252434 | | 11/1971 |
| GB | 1399094 | * | 6/1975 |
| GB | 2156265 | | 10/1985 |
| GB | 2156268 | | 10/1985 |
| GB | 2163124 | | 2/1986 |
| GB | 2252093 | | 7/1992 |

*Primary Examiner*—Stephen K. Cronin
*Assistant Examiner*—Joseph C Merek
(74) *Attorney, Agent, or Firm*—John A. O'Toole; Douglas J. Taylor; Alan D. Kamrath

(57) ABSTRACT

Two portions (10, 12) are injection molded and ultrasonically welded together to form a plastic container (C) defining a hollow interior (16) for containing food products and having an open top sealed by a thin, flexible, foil seal member (14). The container (C) has an inwardly projecting lip (38) which is arched shaped including an outer annular portion (86) extending inward and upward from the sidewall (24) of the container (C) away from the hollow interior (16) of the container (C) and including an inner annular portion (92) radially inward of the outer annular portion (86) and having an outer face (92a) extending downward towards the hollow interior (16) of the container (C). The upper surface of the lip (38) is continuous, smooth and free of steps and ridges to present a continuous seal area for the foil seal member (14) independent of the deflection of the lip (38) into the hollow interior (16) of the container (C).

18 Claims, 1 Drawing Sheet

U.S. PATENT DOCUMENTS

| | | | |
|---|---|---|---|
| 4,386,999 A | 6/1983 | Fortuna et al. | |
| D270,813 S | 10/1983 | Fortuna | |
| D271,665 S | 12/1983 | Fortuna et al. | |
| 4,420,081 A | 12/1983 | Dart | |
| D272,320 S | 1/1984 | Fortuna | |
| D274,217 S | 6/1984 | Aramaki | |
| 4,496,066 A | 1/1985 | Bullock, III | |
| 4,514,242 A | 4/1985 | MacLaughlin et al. | |
| 4,515,651 A | 5/1985 | MacLaughlin et al. | |
| RE31,912 E | 6/1985 | Fortuna et al. | |
| D281,303 S | 11/1985 | Fortuna | |
| D281,399 S | 11/1985 | Fortuna | |
| 4,556,445 A | 12/1985 | McCormick | |
| 4,560,064 A | 12/1985 | Peterson et al. | |
| 4,572,851 A | 2/1986 | Fortuna | |
| 4,575,987 A | 3/1986 | Fortuna | |
| D283,595 S | 4/1986 | Fortuna et al. | |
| D283,596 S | 4/1986 | Fortuna et al. | |
| 4,583,656 A | 4/1986 | MacLaughlin | |
| 4,584,037 A | 4/1986 | Fortuna et al. | |
| D283,677 S | 5/1986 | Fortuna et al. | |
| D283,678 S | 5/1986 | Fortuna et al. | |
| D283,791 S | 5/1986 | Fortunal et al. | |
| D283,793 S | 5/1986 | Fortuna et al. | |
| D284,350 S | 6/1986 | Fortuna et al. | |
| D284,940 S | 8/1986 | Fortuna et al. | |
| D285,530 S | 9/1986 | MacLaughlin | |
| D285,531 S | 9/1986 | Peterson et al. | |
| D285,532 S | 9/1986 | MacLaughlin | |
| D285,536 S | 9/1986 | MacLaughlin | |
| D285,653 S | 9/1986 | Fortuna et al. | |
| D285,654 S | 9/1986 | MacLaughlin | |
| D285,655 S | 9/1986 | MacLaughlin et al. | |
| D285,774 S | 9/1986 | MacLaughlin | |
| D285,775 S | 9/1986 | MacLaughlin | |
| 4,610,351 A | 9/1986 | Coles et al. | |
| 4,613,746 A | 9/1986 | MacLaughlin | |
| 4,618,516 A | 10/1986 | Sager | |
| 4,636,349 A | 1/1987 | MacLaughlin | |
| D291,060 S | 7/1987 | MacLaughlin | |
| D291,062 S | 7/1987 | MacLaughlin | |
| 4,826,039 A | 5/1989 | Landis | |
| 4,854,472 A | 8/1989 | Semersky | |
| 4,872,586 A | 10/1989 | Landis | |
| 5,176,284 A | 1/1993 | Sorensen | |
| 5,180,599 A | 1/1993 | Feldmeier et al. | |
| 5,263,606 A | 11/1993 | Dutt et al. | |
| 5,377,861 A | 1/1995 | Landis | |
| 5,489,036 A | 2/1996 | Arkins | |
| D369,971 S | 5/1996 | Brauner et al. | |
| 5,725,120 A * | 3/1998 | Ramsey et al. | 220/359.5 |
| 5,992,629 A | 11/1999 | Gullord et al. | |

* cited by examiner

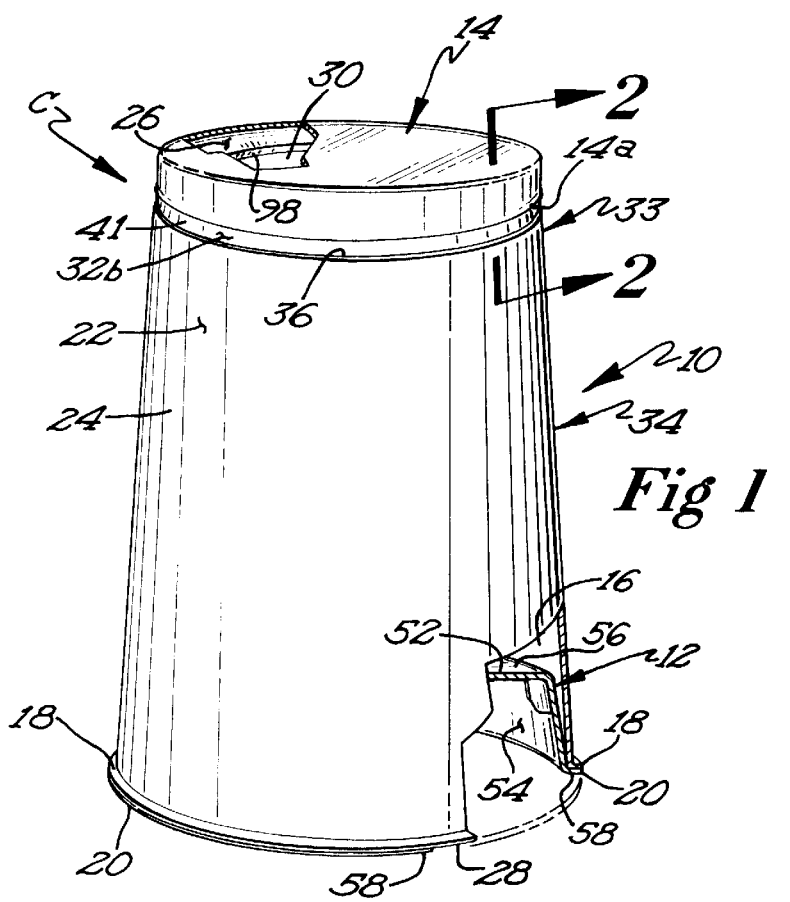
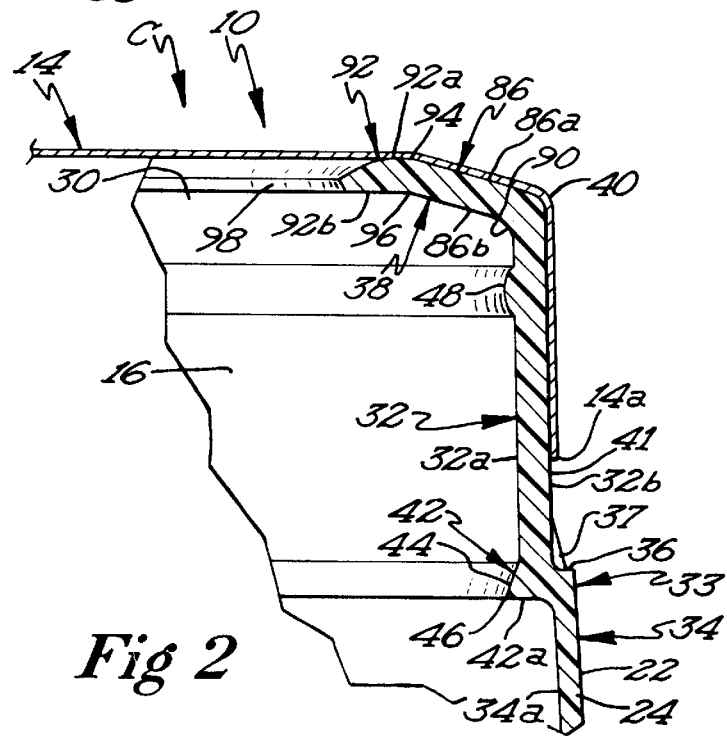

PLASTIC CONTAINER FOR FOOD PRODUCTS

BACKGROUND

The present invention generally relates to plastic containers, particularly to plastic containers for containing food products, specifically to plastic containers for containing refrigerated food products and more specifically to plastic containers for containing yogurt and especially custard.

One area where the use of plastic containers has become widespread is in the food packaging industry. Accordingly, it is common for these plastic food containers to serve as the end display package in which the food product is presented for sale to the consumer. One such plastic container which has gained wide market acceptance for refrigerated food products, especially yogurt, custard and the like, is sealed by a thin, flexible, foil seal member extending over the top of the container. Such containers can be thermo-formed or blow molded, but because of the clear advantages have been recently formed by injection molding for certain container shapes.

It can be appreciated that if not sealed properly, communication is allowed between the interior of the containers and the atmosphere, with containers allowing communication known in the industry as leakers. Such improper sealing results in the food product becoming moldy, especially within the normal or desired shelf life of the product. As such mold normally cannot be detected until the foil seal member is removed, consumers are normally the first to determine that the seal is defective when the container is opened to consume the food product. Thus, consumer complaints are a normal consequence.

In normal production, containers are filled and seal members are sealed to the filled containers at the rate in the order of 400 per minute. At these rates, alignment of the container with the sealing plattens and other operational factors become significant in obtaining proper sealing of the containers. The particular sealing lip of the container is also another factor in obtaining proper sealing of the containers. In particular, unsupported sealing lips extending radially inward of the container sidewall which are utilized in containers having large diameter bases and small diameter tops are especially prone to deflecting under the pressure of the sealing plattens. Also, the particular food product being filled in the containers and specifically contamination of the sealing lips by the food product can cause problems in sealing of the containers. Prior to the present invention, as much as 5 to 20 percent of the injection-molded, polypropylene containers having radially inwardly extending, unsupported sealing lips for holding custard were improperly sealed or in other words were leakers.

Thus, a need exists for plastic containers which are not as prone to leaking when sealed utilizing conventional sealing mechanisms and which otherwise overcomes the deficiencies of prior plastic containers for food products, especially of the type having radially inwardly extending, unsupported sealing lips.

SUMMARY

The present invention solves this need and other problems in the field of plastic containers for food products by providing, in the preferred form, an improved sealing lip projecting inward from the top of the sidewall of an upper container portion of a plastic container. Specifically, the lip includes outer and inner annular portions, with the outer face of the outer annular portion extending upward away from the hollow interior while the outer face of the inner annular portion extends downward towards the hollow interior. The upper surface of the lip including the outer faces of the outer and inner annular portions is continuous, smooth and free of steps and ridges to present a continuous seal area for a thin, flexible, foil seal member independent of the deflection of the lip into the interior of the container.

It is thus an object of the present invention to provide a novel plastic container for food products.

It is further an object of the present invention to provide such a novel plastic container especially adapted for refrigerated food products.

It is further an object of the present invention to provide such a novel plastic container especially adapted for custard.

It is further an object of the present invention to provide such a novel plastic container including an improved seal lip.

It is further an object of the present invention to provide such a novel plastic container including an unsupported, improved sealing lip.

It is further an object of the present invention to provide such a novel plastic container including a radially inwardly extending, improved sealing lip.

It is further an object of the present invention to provide such a novel plastic container reducing the incident of improper sealing.

It is further an object of the present invention to provide such a novel plastic container especially adapted for injection molding.

It is further an object of the present invention to provide such a novel plastic container providing a continuous seal area for a thin, flexible, foil seal member independent of the deflection of the sealing lip into the interior of the container by the sealing mechanism.

These and other objects and advantages of the present invention will become clearer in light of the following detailed description of an illustrative embodiment of this invention described in connection with the drawings.

BRIEF DESCRIPTION OF THE DRAWINGS

The illustrative embodiment may best be described by reference to the accompanying drawings where:

FIG. 1 shows a front view of a plastic food container fabricated in accordance with the preferred teachings of the present invention, with portions broken away to show constructional details.

FIG. 2 shows a partial, enlarged cross sectional view of the package of FIG. 1.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top," "bottom," "first,"

"second," "side," "end," "inner," "outer," "inside," "outside," "upper," "lower," and similar terms are used herein, it should be understood that these terms have reference only to the structure shown in the drawings as it would appear to a person viewing the drawings and are utilized only to facilitate describing the preferred embodiment.

DESCRIPTION OF THE PREFERRED EMBODIMENT

A container for containing food products according to the preferred teachings of the present invention is shown in the drawings and generally designated C. In the preferred form, container C is especially adapted for holding refrigerated food products and in the most preferred form for holding yogurt, custard, and the like. The exemplary dimensions set forth herein are for containers C that are filled with 6 oz. (170 g) of flavored yogurt or custard; however it will be understood that the size of containers C and the dimensions can be varied from that described herein according to the teachings of the present invention.

In the most preferred embodiment of the present invention, container C is an improvement of the type shown and described in U.S. Pat. Nos. 6,325,213 and 6,213,301. For purpose of explanation of the basic teachings of the present invention, the same numerals designate the same or similar parts in the present figures and the figures of U.S. Pat. Nos. 6,325,213 and 6,213,301. The description of the common numerals and container C may be found herein and in U.S. application Ser. Nos. 6,325,213 and 6,213,301, which are hereby incorporated herein by reference.

Particularly, container C is a two-part container having an upper main body portion 10 and a lower base portion 12 which is attached at the bottom 28 of body portion 10 so as to form an open top. After container C is filled, the open top is sealed by a thin, flexible, foil seal member 14 which can be adhered to the top of body portion 10 for sealing the product in the interior 16 of container C.

In the illustrated and preferred embodiment of container C according to the preferred teachings of the present invention, container body portion 10 has a sidewall 24 which has a generally frustoconical shape so that it tapers from a smaller diameter top 26 to a larger diameter bottom 28 at which an annular rim 18 is formed and projects radially outward therefrom.

Container body sidewall 24 includes a short upper thick wall section 32 and a lower thinner wall section 34 therebelow. By way of example and not limitation, the preferred thickness for the thick wall section 32 can be approximately 0.025 inch (0.635 mm) and the preferred thickness of the thinner wall section 34 can be approximately 0.016 inch (0.406 mm). The thickness of the rim 18 at the bottom of the wall section 34 is approximately 0.023 inch (0.584 mm). To achieve the different wall thicknesses for the sections 32 and 34 and rim 18, container C herein is preferably injection molded.

It can be seen that the thick wall section 32 stands substantially vertical or at a very slight incline in the order of 0.5° from the vertical inward relative to the lower thinner wall section 34 which tapers at more of an angle, e.g. 3.5° from vertical, down to the larger diameter bottom 28 of the sidewall 24. The preferred distance from the top 26 of the thick wall section 32 of the sidewall 24 down to the bottom 28 of the flange rim 18 is approximately 3.448 inches (8.758 cm). In addition, the thick wall section 32 steps down from the thinner wall section 34 at exterior shoulder 36 so as to have a smaller diameter relative to the progressively increasing top to bottom diameter of the wall section 34 with the distance from the shoulder 36 to the container body top 26 being short relative to the distance from the shoulder 36 down to the rim 18. The step of the shoulder 36 is approximately 0.015 inch (0.381 mm) so that the exterior surface 32b of wall section 32 is substantially axially aligned with interior surface 34a of wall section 34 at the top thereof. A radially inward projecting lip 38 is provided at the upper end of the wall section 32 and terminates radially distal from the wall section 32 around the container mouth opening 30.

In injection molding of the container upper body portion 10, forces occur during the stripping of the body portion 10 from the mold as the core is pulled out that tend to form a crease in the sidewall 32 above the shoulder 36. To add strength to the sidewall 32, to resist such creasing, a series of ribs 37 are formed on the outside surface of the container C extending upwardly, as viewed in FIG. 2, from the shoulder 36. The ribs 37 add more mass and strength. The preferred ribs 37 have a 4:1 slope with the ribs 37 being four times as high as wide in the radial direction.

For the preferred yogurt container C by way of example and not limitation, the exterior diameter of the vertical thick wall section 32 is approximately 2.061 inches (5.235 cm); and the exterior diameter of the tapered thin wall section 34 at its smallest diameter top portion adjacent transition region 33 is approximately 2.094 inches (5.319 cm) with the interior diameter being approximately 2.006 inches (5.045 cm), and at its largest diameter at the bottom 28, it has an interior diameter of approximately 2.446 inches (6.213 cm). The outer diameter of the radial rim 18 is approximately 2.64 inches (6.706 cm). The annular lip 38 can extend radially from the top 26 of thick wall section 32 for approximately 0.141 inch (3.581 mm) so that the mouth 30 has a diameter of approximately 1.725 inch (4.382 cm). The distance from the shoulder 36 to the top 26 of the thick wall section 32 is approximately 0.310 inch (7.874 mm), and the distance down from the shoulder 36 to the top of the rim 18 is approximately 3.138 inches (7.970 cm) so that the total height of the container body portion 10 in the preferred 6 oz. (170 g) yogurt container embodiment is approximately 3.478 inches (8.834 cm), as previously mentioned. As is apparent, because of the location of the shoulder 36 at the transition region 33 high up along the sidewall 24 so that there is a relatively short upper thick wall section 32, there remains a much longer distance for the smooth wall section 34 so as to provide the food container C herein with a large, uninterrupted surface area on its exterior sidewall surface 22 for receiving printing thereon. It has been found that in the preferred 6 oz. (170 g) yogurt container, the wall section 34 provides for approximately 2.87 inches (7.29 cm) of printing height which is about 10% greater than that afforded with the prior thermoformed and spinwelded container. The median printable circumference around the wall section 34 is 7.17 inches (18.21 cm), and less a ³⁄₁₆ inch (4.76 mm) vertical gap, the printable circumference is 6.99 inches (17.48 cm).

For stacking of container body portions 10, the container sidewall 24 has an interior stacking shoulder or ring 42 formed integrally thereon and projecting radially into the container interior 16 substantially radially aligned with the exterior shoulder 36 so that the stacking ring 42 is provided at the transition region 33 of the sidewall 24 relatively close to the top 26 of the container body portion 10 between the container wall sections 32 and 34. The bottom surface 42a of the stacking ring 42 is spaced below the top surface of the shoulder 36 preferably by approximately 0.020 inch (0.508 mm). The container body portions 10 are stacked with the lip 38 of the lower container body portion 10 abutting the flat bottom surface 42a of the stacking ring 42 of the upper container body portion 10. The distance of the nest interval between rims 18 of adjacent container body portions 10 will be substantially equal to the short distance between the top of the lip 38 and the ring bottom surface 42a which in the preferred form with the dimensions of the container body portion 10 as set forth earlier where the container C is filled with 6 oz. (170 g) of yogurt, gives a nest interval of 0.330 inch (8.382 mm) that is substantially less than the interval provided with the prior spinwelded yogurt container utilizing the lugs as the stacking structure. With the small nest interval of 0.330 inch (8.382 mm), there will be a small air gap of approximately 0.004 inch (0.102 mm) between adjacent wall sections 34 of stacked container body portions 10 in the stack. Thus, present container body portions 10 can be stacked in a much more compact, vertical arrangement providing for substantial savings in transportation costs in that a much greater number of container body portions 10 can be stacked in a prescribed space. This allows, for instance, a greater number of stacked container body portions 10 to be put into a carton box for shipping.

As mentioned, the container body portion 10 is preferably an integral injection-molded piece. Injection molding allows these plastic parts to be formed with more intricate shapes and walls and allows more control over the shape and cross-sectional thicknesses of the plastic so as to enhance the performance and durability of these plastic parts such as when subject to drop testing. In this regard, the transition region 33 between the thick wall section 32 and the thin wall section 34 has a fairly intricate shape with sharp angled corners on the exterior flat shoulder 36 and the inner stacking ring 42. For example, the stacking ring surface 42a intersects with an inclined surface 44 at a sharply angled corner 46 radially distal from the slightly radiused right angle juncture of the surface 42a with the inner surface 34a of the wall section 34.

In the preferred 6 oz. (170 g) yogurt container C, the corner 46 is radially spaced from the inner wall surface 34a a short distance of 0.031 inch (0.7874 mm) so as not to unduly interfere with scooping of food from the container interior 16 while still providing for secure and stable stacking. The angled inclined surface 44 extends upwardly and radially outward from the corner 46 to the interior surface 32a of the wall section 32. As this transitional region 33 is thicker from between the corners of the shoulder 36 and ring 42 relative to wall sections 32 and 34, it also adds strength to the container wall 24. The intricate shape of the wall including the transition area 33 between the wall sections 32 and 34 and the sharp corners and flat surfaces thereof are readily produced by injection molding whereas thermoforming a container having these types of sharply angled surface features would be much more difficult, if not impossible.

Additionally, the container body portion 10 is molded with an inner circumferential bead 48 which is used to strip the container body portion 10 from the mold. The bead 48 is raised from the wall section inner surface 32a and is integral therewith. Preferably the bead 48 is spaced down from the bottom of the lip 38 to its radial inwardmost point by a distance 0.060 inch (1.524 mm) with the radial spacing of this inwardmost point from the wall section interior surface 32a being approximately 0.008 inch (0.203 mm).

The stacking ring 42 extends continuously around the inner circumference at the transition area 33 of the sidewall 24 so as to present an unbroken flat surface 42a to be engaged with the top surface of the top lip 38 for stacking in a secure and stable manner. The continuous stacking ring surface 42a is molded flat to be abutted with the top of the lip 38 of an adjacent stacked container body portion 10. Such an arrangement in the stack presents less of a risk of slippage of the engaged surfaces off from each other, especially when considered in conjunction with the thicker, stronger reinforced sidewall 24 of the container body portion 10. This is particularly important when the container body portions 10 are loaded in the stack as wedging and jamming of the stacked container body portions 10 can prevent separation by the mechanical devices of automatic feeding equipment with which the container body portions 10 and 12 are to be utilized. Thus, the stacking structure including the ring surface 42 and the lip 38 of the present container body portion 10 is effective to maintain a constant and small uniform gap or nest interval between stacked container body portions 10 while keeping them stacked in a secure and stable manner.

Similar to the container body portion 10, the container base 12 is an injection-molded part so that it can be formed with a more intricate shape including having integral walls with different thicknesses. Container base portion 12 includes an upper panel wall 52 and a frustoconical sidewall 54 which depends from the periphery of the panel wall 52 at the top 56 of the wall down to its bottom 58 at which annular rim 20 is formed. Similar to rim 18, the rim 20 projects radially outward from the wall bottom 58. The panel wall 52 is preferably slightly thicker in cross-sectional thickness than both the frustoconical sidewall 54 and the annular rim 20, with annular rim 20, in turn, being generally equal or slightly thicker than the frustoconical sidewall 54.

For example, in the preferred form as a yogurt container C, the container base portion 12 has a base panel 52 with a thickness of 0.018 inch (0.457 mm), a frustoconical sidewall 54 with a thickness of 0.016 inch (0.406 mm) and an annular rim 20 with a thickness of 0.017 inch (0.432 mm). The sidewall 54 tapers at about 7.50° from the vertical and has a vertical height from top 56 to the bottom of the rim 20 of approximately 0.500 inch (1.27 cm). The diameter across the panel wall 52 is preferably approximately 2.334 inches (5.928 cm) with the diameter across the outer edges of the rim 20 being larger, preferably on the order of 2.640 inch (6.706 cm). The base panel wall 52 has a relatively large diameter in comparison to the height of the sidewall 54 so that the panel 52 is more easily deflected when subject to loads due to the large span across the top 56 of the sidewall 54. By injection molding the panel wall 52 so that it is thicker than the sidewall 54, the panel wall 52 is provided with enhanced rigidity so as to be better able to withstand drop tests.

Bottom 28 of body portion 10 is closed off by the container base portion 12 which is ultrasonically welded thereon leaving a mouth 30 at the sidewall top 26 open for being filled with the food product into the container interior 16. To ultrasonically attach the container base portion 12 to the body portion 10, the respective annular rims 18 and 20 are welded to form welded plastic areas between the rims 18 and 20 for connecting the base portion 12 to the body portion 10. More specifically, the rim 18 of the container body portion 10 has a lower surface that is provided with a roughened irregular texture to facilitate ultrasonic bonding to the container base rim 20. In this regard, the container base rim 20 is provided with an upstanding annular energy director projecting from its upper surface, preferably approximately 0.015 inch (0.381 mm) high, and having a rounded top triangular cross-sectional shape. Accordingly, when a single container body portion 10 and a container base portion 12 are removed from their respective stacks such as by the mechanical devices of the processing equipment in engagement with the rims 18 and 20 and brought together in the ultrasonic fixture, the annular rims 18 and 20, and more particularly the textured bottom surface and the energy director will be brought into high frequency vibration with one another with the energy concentrated at the rounded top of the energy director. Once the container base portion 12 is ultrasonically welded to the container body portion 10, the automatic feeding equipment can take the welded container C by the attached rims 18 and 20 to a filling station for being filled with food products and then on to a sealing station where the foil seal member 14 is adhered over the open mouth 30 of the filled container C.

Radially inward projecting lip 38 is shaped according to the preferred teachings of the present invention to facilitate sealing with the seal member 14. In particular, the lip 38 includes a first, outer annular portion 86 having parallel, planar, outer and inner faces 86a and 86b such that the thickness of portion 86 defined by the spacing between faces 86a and 86b is generally constant. Portion 86 and faces 86a and 86b extend inwardly and upwardly away from hollow interior 16 of container C at a small acute angle in the order of 16° in the most preferred form from wall section 32 and surfaces 32a and 32b. In the most preferred form, the corner 40 interconnecting surface 32b and face 86a is rounded at a radius of 0.015 inches (0.38 mm). Similarly, the interconnection 90 between surface 32a and face 86b is rounded at a radius of 0.03 inches (0.76 mm) which in the most preferred form is double the radius of corner 40.

Lip 38 further includes a second, inner annular portion 92 having outer and inner faces 92a and 92b radially inward and in the most preferred form extending inwardly from the inner edge of first portion 86. The outer face 92a extends downward towards the hollow interior 16 of container C. Specifically, in the preferred form shown, faces 92a and 92b are generally planar but are nonparallel, with face 92a extending towards face 92b such that the thickness of the portion 92, defined by the spacing between faces 92a and 92b decrease with radial spacing from sidewall 24. Specifically, in the preferred form, face 92a extends at an obtuse angle in the order of 145° 66' relative to face 92b. Face 92b extends generally horizontally, generally perpendicularly relative to surfaces 32a and 32b of sidewall 24, and at an obtuse angle in the order of 164° from the face 86b. In the most preferred form, the interconnection 94 between faces 86a and 92a is rounded at a radius of 0.086 inches (2.184 mm). Similarly, the interconnection 96 between faces 86b and 92b is rounded at a radius of 0.061 inches (1.549 mm) which in the preferred form is 70% the radius of interconnection 94.

Lip 38 further includes an inner free edge 98, with portion 92 terminating in edge 98 in the preferred form. Edge 98 extends at an obtuse angle relative to face 92b and in the most preferred form at an angle in the order of 150°. Edge 98 extends generally perpendicular to face 92a and in the most preferred form at an angle in the order of 86°.

The foil seal member 14 is adhered over the container top 26 so as to seal the mouth 30 and extends on the upper surface of lip 38 including outer faces 86a and 92a of the lip 38 around the corner 40 formed between the lip 38 and wall section 32 and down towards the shoulder 36 on the exterior surface of the wall section 32 stopping at end 14a thereof. As the foil seal member 14 stops short of the exterior shoulder 36, a gripping space 41 is provided around the bottom of the wall section 32 between the seal member bottom end 14a and the exterior shoulder 36. Thus, to open the container by removal of the foil seal member 14, a person can insert their finger into the gripping space 41 for engaging the seal member end 14a with their fingers and peeling it from the exterior of the upper wall section 32 and lip 38 to remove the seal member 14 from across the container mouth 30 for accessing the food product, e.g. yogurt, in the container interior 16. In the most preferred form, foil seal member 14 is not adhered to wall section 32 but is merely crimped thereon, with the foil seal member 14 being secured only in continuous seal area on the upper surface of lip 38.

Now that the basic construction of container C according to the preferred teachings of the present invention has been set forth, some of the advantages of container C can be highlighted. In particular, container C including portions 10 and 12 according to the preferred teachings of the present invention achieves the advantages as the result of being formed by injection molding and sonic welding, some of which have been touched on herein and have been disclosed in more detail in U.S. Pat. Nos. 6,325,213 and 6,213,301, which are hereby incorporated herein by reference. In this regard, the molding of intricate shapes of differing thicknesses, increased printing surface, the stacking arrangement and specifically the ability to self-center, and the like are some of the advantages obtained.

Lip 38 according to the teachings of the present invention is advantageous for several reasons including but not limited to allowing sealing with seal member 14 at lower temperatures and pressures and with improved reliability than with prior injection molded, polypropylene containers having radially inwardly extending, unsupported lips, with contamination from the food product on lip 38 being less of an issue. Specifically, adhering foil seal member 14 to container top 26 is performed by sandwiching foil seal member 14 against the container top 26 by a platten having a shape to conform the foil seal member 14 over the container top 26. The platten has a heated pressure ring which sandwiched the foil seal member 14 against the lip 38 and which heat activated an adhesion layer on the back side of seal member 14 which abuts with the lip 38 and effects a bond between seal member 14 and lip 38 of portion 10. Lip 38 will then deflect from the applied pressure and will tend to soften because of the increased temperature necessary to effect the seal. It should be appreciated that foil seal members 14 are simultaneously being applied to multiple (such as eight) containers C in conventional equipment, and alignment of the heated pressure ring with the container top 26 and in particular lip 38 is not consistent. It should then be noted that it is necessary to provide a continuous seal area between seal member 14 and lip 38. If a continuous seal area is not obtained, then leakage of air into and out of the interior 16 of container C occurs. Such leakage typically results in food products becoming moldy within normal storage times.

Another problem is that the devices which fill the containers C will often dribble, such that food product will be present on lip 38. This is especially a problem for hot food products such as custard which are packed in a liquid form (and thus more prone to dribble or spill on top of lip 38) and sets up in container C. Food product must be removed from lip 38, because food product present in the seal area will prevent sealing between lip 38 and foil seal member 14.

The third, inner annular portion of the lip 38 of FIG. 15 of U.S. Pat. No. 6,213,301 tends to dive, i.e. the free edge thereof tends to move downwardly when pressure by the platten was applied in the sealing operation, making it difficult to get a continuous seal area between the lip and the foil seal member. Additionally, the container of U.S. Pat. No. 6,213,301 is formed of polypropylene which softens at higher temperatures than polystyrene and specifically above the boiling point of the food product and in particular in the order of 260° F. (126.6° C.) and greater. This resulted in any food product on the lip flashing off and preventing any sealing at that location.

Additionally, in prior stepped lips, sealing occurred against one or more shoulders of the lip. Thus, the area of the seal was minimal and such that any defect in the seal would be detrimental and result in a discontinuity of the seal.

Container C according to the teachings of the present invention avoids these deficiencies by providing lip 38 of an arched configuration. Particularly, the upper surface of lip 38 is continuous, smooth, and free of steps and ridges. The upward angle of outer annular portion 86 increases the resistance of lip 38 to deflect or dive from the pressure applied during sealing. However, it should be appreciated that if lip 38 according to the teachings of the present invention should dive or in other words if inner edge 98 should move downwardly into interior 16, faces 86a and 92a of lip 38 will continue to provide a continuous seal area to which seal member 14 seals independent of the deflection of the lip 38 into the hollow interior 16 of container C. Additionally, it should be appreciated that in the event that the sealing platten is not aligned with lip 38, the continuous seal area may not be circular in shape but could be elliptical in shape or have shapes according to the actual deflection of lip 38. Additionally, according to the preferred teachings of the present invention, the height to interconnection 94 which represents the maximum height of lip 38 was increased 0.005 inch (0.127 mm) from the height of the lip of FIG. 15 of U.S. Pat. No. 6,213,301 to increase the range of deflection of lip 38. Further, the area of the sealing pattern is considerably larger on faces 86a and/or 92a of lip 38 according to the teachings of the present invention than what would occur if sealing occurred along one or more shoulders of a stepped lip.

It should then be appreciated that container C is utilizing a different approach in obtaining sealing than prior containers. Particularly, prior containers utilized lips of a stepped design to resist deflection so that high pressure could be applied by the platten to attempt to achieve a continuous seal area. Lip 38 according to the teachings of the present invention is unsupported, with the lip 38 deflecting to self align with the platten to achieve a continuous seal area. Additionally, the pressure at which the platten is applied to container C to effect a continuous seal area is considerably less than for prior injection molded, polypropylene containers having radially inwardly extending, unsupported sealing lips.

Additionally, the arched shape of lip 38 according to the teachings of the present invention cannot trap food product located thereon which can be a problem with stepped type lips of prior containers. Specifically, any food product on lip 38 according to the teachings of the present invention will be pushed down faces 86a and/or 92a or in other words squeegeed away from the continuous seal area when seal member 14 is sandwiched against lip 38 by the sealing platten so that the continuous seal area is not interrupted because of the undesired presence of food product on lip 38. The presence of food product on lip 38 in the continuous seal area is especially a problem when container C is formed of polypropylene because the sealing temperature is relatively high and greater than the boiling point of the food product and especially in the order of 300° F. to 360° F. (148.8° C. to 182.2° C.) where flashing off of the food product occurs.

Utilizing lip 38 according to the teachings of the present invention, less than 0.5% of all containers C do not have a continuous seal area between lip 38 and foil seal member 14, which is a dramatic improvement over prior injection molded, polypropylene containers having radially inwardly extending, unsupported sealing lips for holding custard or similar food products.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. An upper container portion for a plastic container having a hollow interior for receiving food products therein, with the upper container portion comprising, in combination: a sidewall having a top; and a lip projecting radially inward from the top of the sidewall, with the lip including an outer annular portion extending from the sidewall, with the outer annular portion having an outer face extending upward away from the hollow interior of the plastic container at a small acute angle, with the lip including an inner annular portion radially inward of the outer annular portion, with the inner annular portion having an outer face extending from the outer annular portion downward towards the hollow interior of the plastic container, wherein the inner annular portion has an inner face extending from the outer annular portion and has a thickness between the inner face and the outer face, with the thickness of the inner annular portion decreasing with radial spacing from the sidewall, with the inner annular portion terminating in a free edge, with the lip having an upper surface including the outer faces of the inner and outer annular portions, with the upper surface being continuous and smooth to present a continuous seal area for a seal member by the lip independent of the deflection of the lip into the interior of the container.

2. The upper container portion of claim 1 wherein the outer face of the outer annular portion is planar and the outer face of the inner annular portion includes a planar portion extending from the free edge.

3. The upper container portion of claim 2 wherein the inner face of the inner annular portion extends generally perpendicular to the sidewall.

4. The upper container portion of claim 3 wherein the free edge extends generally perpendicular to the outer face of the inner annular portion.

5. The upper container portion of claim 4 wherein the outer annular portion has an inner face substantially parallel to the outer face, with the thickness of the outer annular portion being generally constant.

6. An upper container portion for a plastic container having a hollow interior for receiving food products therein, with the upper container portion comprising, in combination: a sidewall having a top, wherein the sidewall includes an inner surface and an outer surface; and a lip projecting radially inward from the top of the sidewall, with the lip including an outer annular portion extending from the sidewall, with the outer annular portion having an outer face extending upward away from the hollow interior of the plastic container at a small acute angle, with the outer surface of the sidewall and the outer face of the outer annular portion being interconnected at a rounded corner, with the outer annular portion having an inner face, with the inner surface of the sidewall and the inner face of the outer annular portion being interconnected at a rounded interconnection having a radius double of the rounded corner, with the lip including an inner annular portion radially inward of the outer annular portion, with the inner annular portion having an outer face extending from the outer annular portion downward towards the hollow interior of the plastic container, with the inner annular portion terminating in a free edge, with the lip having an upper surface including the outer faces of the inner and outer annular portions, with the upper surface being continuous and smooth to present a continuous seal area for a seal member by the lip independent of the deflection of the lip into the interior of the container.

7. The upper container portion of claim 6 wherein the outer faces of the inner and outer annular portions are interconnected at a rounded interconnection; wherein the inner annular portion has an inner face; and wherein the inner faces of the inner and outer annular portions are interconnected at a rounded interconnection having a radius which is 70% of the rounded interconnection interconnecting the outer faces of the inner and outer annular portions.

8. The upper container portion of claim 7 wherein the sidewall includes an upper wall section terminating in a lower wall section, with the upper wall section having the top, with the upper wall section stepping down from the lower wall section.

9. An upper container portion for a plastic container having a hollow interior for receiving food products therein, with the upper container portion comprising, in combination: a sidewall having a top, with the sidewall including an upper wall section terminating in a lower wall section; and a lip projecting radially inward from the top of the sidewall, with the lip including an outer annular portion extending from the sidewall, with the outer annular portion having an outer face extending upward away from the hollow interior of the plastic container, with the lip including an inner annular portion radially inward of the outer annular portion, with the inner annular portion having an outer face extending from the outer annular portion downward towards the hollow interior of the plastic container, with the inner annular portion terminating in a free edge, with the lip having an upper surface including the outer faces of the inner and outer annular portions, with the upper surface being continuous and smooth to present a continuous seal area for a seal member by the lip independent of the deflection of the lip into the interior of the container, wherein a thickness of a outer annular portion is greater than a thickness of the upper wall section, with the thickness of the upper wall section being greater than a thickness of the lower wall section.

10. The upper container portion of claim 9 wherein the lower wall section is frustoconical in shape and tapers outwardly from the upper wall section.

11. The upper container portion of claim 10 wherein the lower wall section includes an interior surface and a stacking ring projecting radially inward from the interior surface of the lower wall section allowing upper container portions to be stacked one on top of the other in a compact vertical arrangement.

12. The upper container portion of claim 11 wherein the lower wall section includes a bottom and an annular rim projecting radially outward from the bottom of the lower wall section, with the annular rim having welding areas therearound disposed for ultrasonic attachment with other container portions, with the annular rim adapted to cooperate with high speed automatic container feeding equipment.

13. The upper container portion of claim 1 wherein the inner face of the inner annular portion extends generally perpendicular to the sidewall.

14. The upper container portion of claim 1 wherein the free edge extends generally perpendicular to the outer face of the inner annular portion.

15. The upper container portion of claim 1 wherein the outer annular portion has an inner face substantially parallel to the outer face, with the thickness of the outer annular portion being generally constant.

16. The upper container portion of claim 15 wherein the sidewall includes an inner surface and an outer surface, with the outer surface of the sidewall and the outer face of the outer annular portion being interconnected at a rounded corner, with the inner surface of the sidewall and the inner face of the outer annular portion being interconnected at a rounded interconnection having a radius double of the rounded corner.

17. The upper container portion of claim 1 wherein the outer and inner annular portions each include an inner face; wherein the outer faces of the inner and outer annular portions are interconnected at a rounded interconnection; and wherein the inner faces of the inner and outer annular portions are interconnected at a rounded interconnection having a radius which is 70% of the rounded interconnection interconnecting the outer faces of the inner and outer annular portions.

18. The upper container portion of claim 9 with the upper wall section having the top, with the upper wall section stepping down from the lower wall section.

* * * * *